United States Patent [19]
Albrecht

[11] 3,718,454
[45] Feb. 27, 1973

[54] STABILIZED PESTICIDAL WETTABLE POWDER FORMULATIONS

[75] Inventor: Konrad Albrecht, Frankfurt am Main, Germany

[73] Assignee: Farbwerke Hoechst Aktiengesellschaft vormals Meister Lucius & Bruning, Frankfurt am Main, Germany

[22] Filed: Dec. 2, 1969

[21] Appl. No.: 881,587

[30] Foreign Application Priority Data

Dec. 5, 1968 Germany................P 18 12 947.0

[52] U.S. Cl....................71/106, 71/120, 71/DIG. 1, 424/311, 424/337
[51] Int. Cl. .............................................A01n 9/24
[58] Field of Search....71/106, DIG. 1, 120; 424/311, 424/337

[56] References Cited

UNITED STATES PATENTS

| 2,709,648 | 5/1955 | Ryken | 71/106 |
| 3,130,037 | 4/1964 | Scherer et al. | 71/106 |
| 3,535,423 | 10/1970 | Ondas | 71/DIG. 1 |

Primary Examiner—James O. Thomas, Jr.
Attorney—Curtis, Morris & Safford

[57] ABSTRACT

The invention provides stabilized pesticidal formulations containing at least one 4,6-dinitro-2-sec.butylphenyl ester as active ingredient and as a stabilizing agent a sodium dinaphthylmethane disulfonate having unsatified free sulfonic acid groups.

8 Claims, No Drawings

STABILIZED PESTICIDAL WETTABLE POWDER FORMULATIONS

The present invention relates to stabilized pesticidal wettable powder formulations.

Esters of 4,6-dinitro-2-sec.butylphenol (DNBP), for example binapacryl [3-methylcrotonic acid 2-sec-butyl-4,6-dinitrophenyl ester] and dinoseb acetate [acetic acid 2-sec-butyl-4,6-dinitrophenyl ester], are used, depending on the type of acid used for esterification, as acaricides, fungicides or herbicides. The speed of hydrolysis into the free DNBP is influenced by the constitution of the acid, this having undesired consequences in formulations of the said esters as wettable powders. The formation of free DNBP limits the selectivity of herbicidal compositions. Also, free DNBP is toxic and with acaricidal preparations it causes phytotoxic damage. Moreover, the formation of DNBP in higher concentrations involves a break-down of the physical properties of the respective formulations. The suspendability rapidly diminishes in storage and no longer meets international requirements.

As dispersing agents for the wettable powder formulations there are generally used the sodium salts of alkyl-naphthalene-sulfonic acids, dinaphthylmethane-sulfonic acids, alkyl-benzene-sulfonic acids, as well as oleyl methyl tauride, sodium lignin sulfonates or partially saponified polyvinyl acetates.

Owing to its good dispersing properties and minor foam formation the sodium salt of dinaphthylmethane-disulfonic acid, which ensures the required suspension properties, has preferably been used for highly concentrated wettable powders of DNBP esters and the combinations thereof with urea herbicides. A 10 percent solution of the said sodium salt in distilled water has a pH value of 7 to 8. It is evident from the following examples that products containing this dispersing agent are stable in storage to a limited extent only. DNBP is formed and causes the aforesaid damages.

Additions of polypropylene glycol exhibit a stabilizing effect only in the case of binapacryl. But non ionic components of this type have the drawback that in most cases the wettable powders formulated therewith cannot be mixed with other wettable powders as the latter flocculate in the spray liquor. Additions of 2 to 5 percent of acid components, such as sodium bisulfate, alkylphosphoric acids, alkylsulfonic acids or tolyl-benzene-sulfonic acids, do not improve the storability and stability of the active ingredients.

It has now been found that a not completely neutralized sodium dinaphthylmethane-disulfonate still carrying free sulfonic acid groups, which, if measured in a 10 percent aqueous solution has a pH of 5 to 6.8, preferably 6.4 to 6.8, is suitable in an amount of from 4 to 15 percent by weight, preferably 6 to 10 percent by weight, calculated on the total mixture, can be used as a stabilizing dispersing agent for wettable powders of DNBP esters such as binapacryl and its acaricidal combinations with tetradifon [4-chlorophenyl-2,4,5-trichlorophenyl sulfone] or tetrasul [2,4,4',5-tetrachlorodiphenyl sulfide]. The stabilizer can also be used with agents such as dinoseb acetate and its combinations with urea herbicides, preferably monolinuron [3-(41-methoxy-1-methylurea]; linuron [3-(3,4-dichlorophenyl)-1-methoxy-1-methylurea]; neburon [1-butyl-3-(3,4-dichlorophenyl)-1-methylurea]; diuron [3-(3,4-dichlorophenyl)-1,1-dimethylurea]; [3-(4-chlorophenyl)-1,1-dimethylurea]. In the finely ground wettable powders the stabilizing dispersing agent confers upon the active ingredients the necessary stability so that acaridical formulations thereof do not cause phytotoxic damage and in wettable herbicidal powders the selective range of efficacy and the suspension properties are maintained for a storage time of 2 to 3 years (according to general experience a stability in storage of 1 month at 50° C corresponds to a stability in storage for 1 year at normal temperature). Thus combination formulations of DNBP esters with urea herbicides could be prepared for the first time.

The dispersing agent having the stabilizing effect can be obtained, for example, by neutralizing an aqueous solution of free dinaphthylmethane-disulfonic acid with sodium hydroxide solution, sodium carbonate or sodium hydrocarbonate until a sample of a 10 percent aqueous solution thereof has the specified pH value and then evaporating the solution to dryness.

In the following examples there are compared the properties of an "unstable" formulation containing sodium dinaphthyl-methane disulfonate having the conventional neutral pH of 7 to 8 with a formulation containing sodium dinaphthylmethane disulfonate having the "stabilizing" pH of 6.4 to 6.8 as regards the formation of free DNBP and the suspension property of the respective formulations after prolonged storage.

Example 1

Wettable powder with 40 percent of dinoseb acetate a) unstable — composition — b) stabilized
- 40 % of dinoseb acetate
- 48 % of finely divided silicic acid
- 10 % of sodium dinaphthylmethane disulfonate
- 1 % of sodium alkylbenzene sulfonate
- 1.0 % of polyvinyl alcohol pH 7 – 8 (unstable), pH 6.4 – 6.6 (stabilized)

| content of DNBP in % | at the beginning | after storage at 50° C for 1 month | 2 months | 3 months |
|---|---|---|---|---|
| unstable | 2.0 | 8.1 | 12 | 18 |
| stabilized | 1.5 | 2.0 | 2.8 | 3.0 |

| total suspendability in % | at the beginning | 1 month | 2 months | 3 months |
|---|---|---|---|---|
| unstable | 77 | 69 | 59 | 53 |
| stabilized | 82 | 80 | 78 | 76 |

Example 2

Wettable powder with 37.5 percent of dinoseb acetate and 12.5 percent of monolinuron a) unstable — composition — b) stabilized
- 37.5 % of dinoseb acetate
- 12.5 % of monolinuron
- 38.5 % of finely divided silicic acid
- 9.0 % of sodium dinaphthyl-methanedisulfonate
- 1.1 % of sodium alkylbenzene sulfonate
- 1.4 % of partially saponified polyvinyl acetate pH 7 – 8 (unstable), pH 6.4 – 6.6 (stabilized)

| content of DNBP in % | at the beginning | after storage at 50° C for 1 month | 2 months | 3 months |
|---|---|---|---|---|
| unstable | 1.4 | 15 | discontinued | |
| stabilized | 1.8 | 3.8 | 5.4 | 6.8 |

| total suspendability in % | at the beginning | 1 month | 2 months | 3 months |
|---|---|---|---|---|
| unstable | | 84 | 63 | below 50 |

Example 3

Wettable powder with 37.5 percent of dinoseb acetate and 12.5 percent of linuron a) unstable composition
37.5 % of dinoseb acetate
12.5 % of linuron
37.5 % of finely divided silicic acid
pH 7 – 8   10.0 % of sodium dinaphthyl-methane disulfonate
1.1 % of sodium alkylbenzene sulfonate
1.4 % of partially saponified polyvinyl acetate b) stabilized   pH 6.4 – 6.6

|  | at the beginning | after storage at 50° C for |  |  |
|---|---|---|---|---|
|  |  | 1 month | 2 months | 3 months |
| content of DNBP in % |  |  |  |  |
| unstable | 0.8 | 23 |  |  |
| stabilized | 1.8 | 3.8 | 5.0 | 6.6 |
| total suspendability in % |  |  |  |  |
| unstable | 81 | 56.8 |  |  |
| stabilized | 85 | 82 | 81 | 80 |

Example 4

Wettable powder with 37.5 percent of dinoseb acetate and 12.5 percent of diuron a) unstable composition
37.5 % of dinoseb acetate
12.5 % of diuron
38.5 % of finely divided silicic acid
pH 7 – 8   9.0 % of sodium dinaphtyl-methane disulfonate
1.1 % of sodium alkylbenzene sulfonate
1.4 % of partially saponified polyvinyl acetate b) stabilized   pH 6.4 – 6.8

|  | at the beginning | after storage at 50° C for |  |  |
|---|---|---|---|---|
|  |  | 1 month | 2 months | 3 months |
| content of DNBP in % |  |  |  |  |
| unstable | 1.5 | 15.5 | discontinued |  |
| stabilized | 1.5 | 3.5 | 5.0 | 6.6 |
| total suspendability in % |  |  |  |  |
| unstable | 86 | 70 | 52 |  |
| stabilized | 88 | 85 | 78 | 77 |

Example 5

Wettable powder with 37.5 percent of dinoseb acetate and 12.5 percent of monuron a) unstable composition
37.5 % of dinoseb acetate
12.5 % of monuron
38.5 % of finely divided silicic acid
pH 7 – 8   9.0 % of sodium dinaphthylmethane disulfonate
1.1 % of sodium alkylbenzene sulfonate
1.4 % of partially saponified polyvinyl acetate b) stabilized   pH 6.4 – 6.8

|  | at the beginning | after storage at 50° C for |  |  |
|---|---|---|---|---|
|  |  | 1 month | 2 months | 3 months |
| content of DNBP in % |  |  |  |  |
| unstable | 1.0 | 17.5 | discontinued |  |
| stabilized | 1.1 % | 3.7 % | 4.9 % | 6.5 |
| total suspendability in % |  |  |  |  |
| unstable | 80 | 60.2 | 5.1 |  |
| stabilized | 86 | 83 | 78 | 77.5 |

Example 6

Wettable powder with 37.5 percent of dinoseb acetate and 12.5 percent of neburon a) unstable composition
37.5 % of dinoseb acetate
12.5 % of neburon
37.5 % of finely divided silicic acid
pH 7 – 8   10.0 % of sodium dinaphthylmethane disulfonate
1.1 % of sodium alkylbenzene sulfonate
1.4 % of partially saponified polyvinyl acetate b) stabilized   pH 6.4 – 6.8

|  | at the beginning | after storage at 50° C for |  |  |
|---|---|---|---|---|
|  |  | 1 month | 2 months | 3 months |
| content of DNBP in % |  |  |  |  |
| unstable | 1.4 | 15.6 | discontinued |  |
| stabilized | 1.3 | 2.9 | 5.1 | 6.5 |
| total suspendability in % |  |  |  |  |
| unstable | 81 | 62 | 50 |  |
| stabilized | 82 | 80 | 79 | 77 |

Example 7

Binapacryl as wettable powder of 50 percent strength (acaracide)

(Phytotoxic damage with a DNBP content of more than 0.6 percent a. unstable formulation
   50.0 percent of binapacryl
   41.0 percent of finely divided silicic acid
   5.0 percent of sodium dinaphthylmethane disulfonate pH 7 – 8
   2.0 percent of sodium alkylnaphthalene sulfonate
   2.0 percent of partially saponified polyvinyl acetate

|  | at the beginning | after storage at 50° C for |  |  |
|---|---|---|---|---|
|  |  | 1 month | 2 months | 3 months |
| content of DNBP in % | 0.1 | 0.4 | 0.8 | 1.5 |
| total suspendability in % | 97 | 70 | 46 | 27 | b. stabilized formulation
   50.0 percent of binapacryl
   38.0 percent of Kieselguhr
   8.0 percent of sodium dinaphthylmethane disulfonate
   pH 6.4 – 6.6
   1.0 percent of sodium alkylnaphthalene sulfonate
   1.0 percent of sodium alkylbenzene sulfonate
   2.0 percent of partially saponified polyvinyl acetate

|  | at the beginning | after storage at 50° C for |  |  |
|---|---|---|---|---|
|  |  | 1 month | 2 months | 3 months |
| content of DNBP in % | 0.1 | 0.2 | 0.4 | 0.5 |
| total suspendability in % | 93 | 91 | 89 | 88 |

Example 8 (acaricide)

Wettable powder with 40 percent of binapacryl and 10 percent of tetradifon a) unstable composition
40.0 % of binapacryl
10.0 % of 2,4,5,4'-tetrachlorodiphenyl sulfone (tetradifon)
39.0 % of kieselguhr
pH 7 – 8   7.0 % of sodiumdinapthylmethane disulfonate
2.0 % of partially saponified polyvinyl acetate
2.0 % of sodium alkylnaphthalene sulfonate b) stabilized   pH 6.4 – 6.8

|  | at the beginning | after storage at 50° C for |  |  |
|---|---|---|---|---|
|  |  | 1 month | 2 months | 3 months |
| content of DNBP in % |  |  |  |  |

|  | at the beginning | after storage at 50° C for |  |  |
|---|---|---|---|---|
|  |  | 1 month | 2 months | 3 months |
| content of DNBP in % |  |  |  |  |
| unstable | 0.1 | 0.3 | 0.9 | 1.3 |
| stabilized | 0.1 | 0.1 | 0.1 | 0.2 |
| total suspendability in % |  |  |  |  |
| unstable | 87 | 70 | 60 | 55 |
| stabilized | 89 | 86 | 82 | 79.5 |

Example 9 (acaricide)

Wettable powder with 40 percent binapacryl and 10 percent of tetrasul a) unstable composition  
40 % of binapacryl  
10.0 % of 2,4,4',5-tetrachlorodiphenyl sulfide (tetrasul)  
9.0 % of kieselguhr  
pH 7 – 8      7.0 % of sodium dinaphthylmethane disulfonate  
2.0 % of partially saponified polyvinyl acetate  
2.0 % of sodium alkylnaphthalene sulfonate  
30.0 % of finely divided silicic acid b) stabilized pH 6.4 – 6.8

|  | at the beginning | after storage at 50° C for |  |  |
|---|---|---|---|---|
|  |  | 1 month | 2 months | 3 months |
| content of DNBP in % |  |  |  |  |
| unstable | 0.1 | 0.3 | 0.8 | 1.1 |
| stabilized | 0.1 | 0.1 | 0.1 | 0.1 |
| total suspendability in % |  |  |  |  |
| unstable | 90 | 79 | 64 | 57 |
| stabilized | 88 | 85 | 85 | 79 |

What is claimed is:

1. In a pesticidal wettable powder formulation comprising a finely-divided solid carrier, at least one dinitro-secbutylphenyl ester as the pesticidal agent, and a dispersing agent, the improvement wherein said formulation comprises, as a stabilizing and dispersing agent, from 4 to 15 percent, by total weight of the formulation, of an incompletely neutralized dinaphthylmethane disulfonic acid sodium salt having free sulfonic acid groups, said salt, if dissolved in water, being capable of forming a 10 percent aqueous solution having a pH value between 5 and 6.8.

2. A formulation as in claim 1 wherein said salt is present in an amount from 6 to 10 percent by total weight of the formulation.

3. A formulation as in claim 1 wherein a 10 percent aqueous solution of said salt has a pH between 6.4 and 6.8.

4. A formulation as in claim 1 wherein said pesticidal agent is acetic acid 2-sec-butyl-4,6-dinitrophenyl ester or 3-methylcrotonic acid 2-sec-butyl-4,6-dinitrophenyl ester.

5. A formulation as in claim 1 wherein said pesticidal agent is 3-methylcrotonic acid 2-sec-butyl-4,6-dinitrophenyl ester in combination with another acaricide selected from the group consisting essentially of 4-chlorophenyl-2,4,5-trichlorophenyl sulfone and 2,4,4',5-tetrachlorodiphenyl sulfide.

6. A formulation as in claim 5 wherein said ester and said other acaricide are present in a ratio of about 4:1 and in a total amount which is about 50 percent by weight of the formulation.

7. A formulation as in claim 1 wherein said pesticidal agent is acetic acid 2-sec-butyl-4,6-dinitrophenyl ester in combination with a urea herbicide which is a member selected from the group consisting of 3-(3,4-dichlorophenyl)-1-methoxy-1-methylurea; 3-(4-chlorophenyl)-1-methoxy-1-methylurea; 1-butyl-3-(3,4-dichlorophenyl)-1-methylurea; 3-(3,4-dichlorophenyl)-1,1-dimethylurea; and 3-(4-chlorophenyl)-1,1-dimethylurea.

8. A formulation as in claim 1 wherein said acetic acid 2-sec-butyl-4,6-dinitrophenyl ester and said urea herbicide are present in a ratio of about 3:1 and in a total amount which is about 50 percent by weight of the formulation.

* * * * *